(12) United States Patent
Poskie et al.

(10) Patent No.: US 7,723,895 B2
(45) Date of Patent: May 25, 2010

(54) ROTATING ELECTRIC MACHINE APPARATUS AND METHOD OF ASSEMBLY

(75) Inventors: Frederick R. Poskie, Plymouth, MI (US); Richard A. Pashnik, Saline, MI (US); Edward L. Kaiser, Orion, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 70 days.

(21) Appl. No.: 11/936,087

(22) Filed: Nov. 7, 2007

(65) Prior Publication Data

US 2009/0115264 A1 May 7, 2009

(51) Int. Cl.
*H02K 15/00* (2006.01)
(52) U.S. Cl. .................................. 310/261.1; 310/417

(58) Field of Classification Search .................. 310/42, 310/156.23, 156.28, 156.31, 261.1, 271, 310/417, 254.1
See application file for complete search history.

(56) References Cited

U.S. PATENT DOCUMENTS

| 4,118,644 A | * | 10/1978 | Schulte et al. | 310/42 |
| 4,955,128 A | * | 9/1990 | Sogabe et al. | 29/596 |
| 6,891,296 B1 | * | 5/2005 | Huang et al. | 310/156.01 |
| 7,355,316 B2 | * | 4/2008 | Yokota et al. | 310/261 |

FOREIGN PATENT DOCUMENTS

| JP | 2004-254394 | * | 9/2004 |
| JP | 2006-115666 | * | 4/2006 |

* cited by examiner

*Primary Examiner*—Dang D Le

(57) ABSTRACT

A rotating electric machine apparatus includes at least one end plate associated with an inner assembly unit that operates to prevent contact between the inner assembly unit and an outer assembly unit. The end plate is peripherally sized to allow the slidable assembly of the inner assembly unit into the outer assembly unit while preventing undesirable contact of the inner assembly unit with the outer assembly unit.

9 Claims, 5 Drawing Sheets

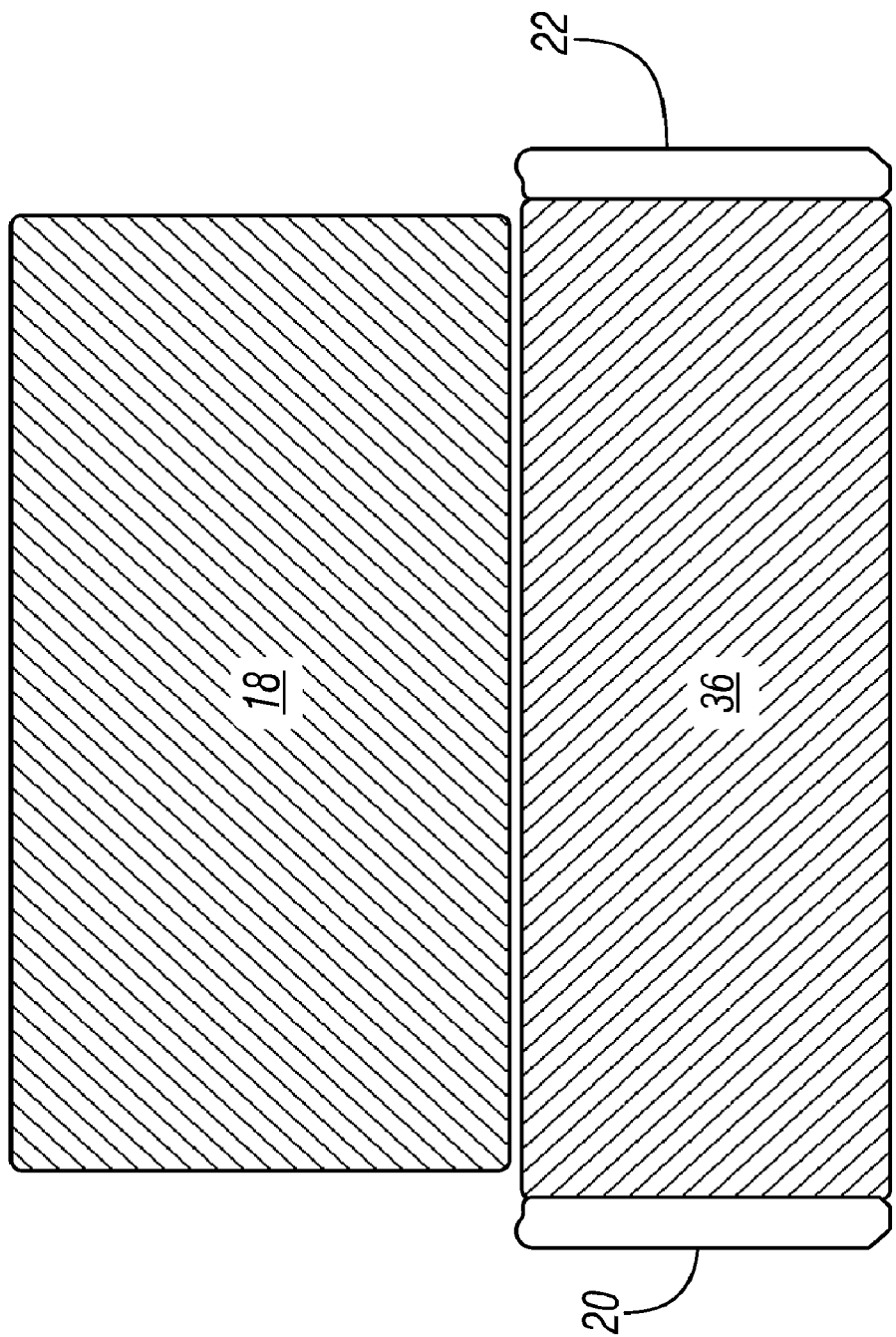

ROTATING ELECTRIC MACHINE APPARATUS AND METHOD OF ASSEMBLY

TECHNICAL FIELD

The present disclosure relates to rotating electric machines.

BACKGROUND OF THE INVENTION

Assembly of rotor assemblies within stator assemblies associated with a motor requires tooling precision to align rotor and stator units.

Motor assembly is accomplished using precision fixturing to center and align a heavily magnetized rotor unit into a ferrous stator unit. The rotor unit is a cylindrical magnetized component and the stator unit is an iron based "tube" that closely matches the rotor unit in diameter and length. Inserting the rotor unit into the stator unit is complicated by the fact that the rotor magnetically pulls itself toward the stator unit and adheres magnetically thereto. Even in the absence of magnetized components, the desirably minimal air gap between the stator and rotor leaves little tolerance for assembly error.

When the rotor unit contacts the stator unit, damage to both units can occur and unwanted debris may be generated by the scraping of the rotor unit against the stator unit, thereby inhibiting operation of the motor.

What is needed is a motor apparatus that is robust and tolerant of the assembly process and a method for assembly of a motor that avoids damage occasioned by interference of the rotor and stator during assembly.

SUMMARY

A rotating electric machine apparatus includes concentric rotor and stator assemblies including an end plate that cooperates during assembly of the motor apparatus to prevent undesirable contact between the rotor assembly and the stator assembly.

BRIEF DESCRIPTION OF THE DRAWINGS

One or more embodiments will now be described, by way of example, with reference to the accompanying drawings, in which:

FIG. 5 illustrates a cross sectional view of a stator assembly associated with endplates with assembly guide rings assembled in combination with a rotor assembly in accordance with the present disclosure.

DETAILED DESCRIPTION

The present disclosure relates to preventing undesirable contact between a rotor assembly and a stator assembly associated with a motor apparatus during assembly of the motor. The embodiments described help prevent the scraping of the rotor and stator against each other that may produce undesirable debris. While reference is made to motors herein, the present disclosure is equally applicable to any rotating electric machines including electric generators.

A motor apparatus in accordance with the present disclosure includes at least one end plate associated with the rotor assembly that allow easy assembly of the rotor assembly within the stator assembly, particularly when using manual assembly tooling. The ease of assembly may reduce assembly costs and the time required to assemble the electric machine.

The embodiments of the present disclosure may be used with any magnetic or non-magnetic motor. Additionally, the motor used may either have a rotor that is adapted to fit inside a stator, or alternatively, a motor that has a stator adapted to fit inside a rotor. While the embodiments of the present disclosure may be used with either rotor-stator combination, the specific embodiments shown in FIGS. 1-4 illustrates a motor having a rotor adapted to fit within a stator, wherein FIG. 5 illustrates a motor having a stator adapted to fit within a rotor. In an embodiment, the motor is an electric motor for use in a hybrid vehicle.

End plates may be formed by any non-magnetic material capable of maintaining a rigid structure during assembly of the rotor unit within the stator unit. Preferably, the non-magnetic material is of a hardness and quality that will not subject portions of the motor apparatus foreseeably contacted thereby during the motor apparatus assembly process to damage as will become more apparent in conjunction with the description which follows herein below.

Figure 1:
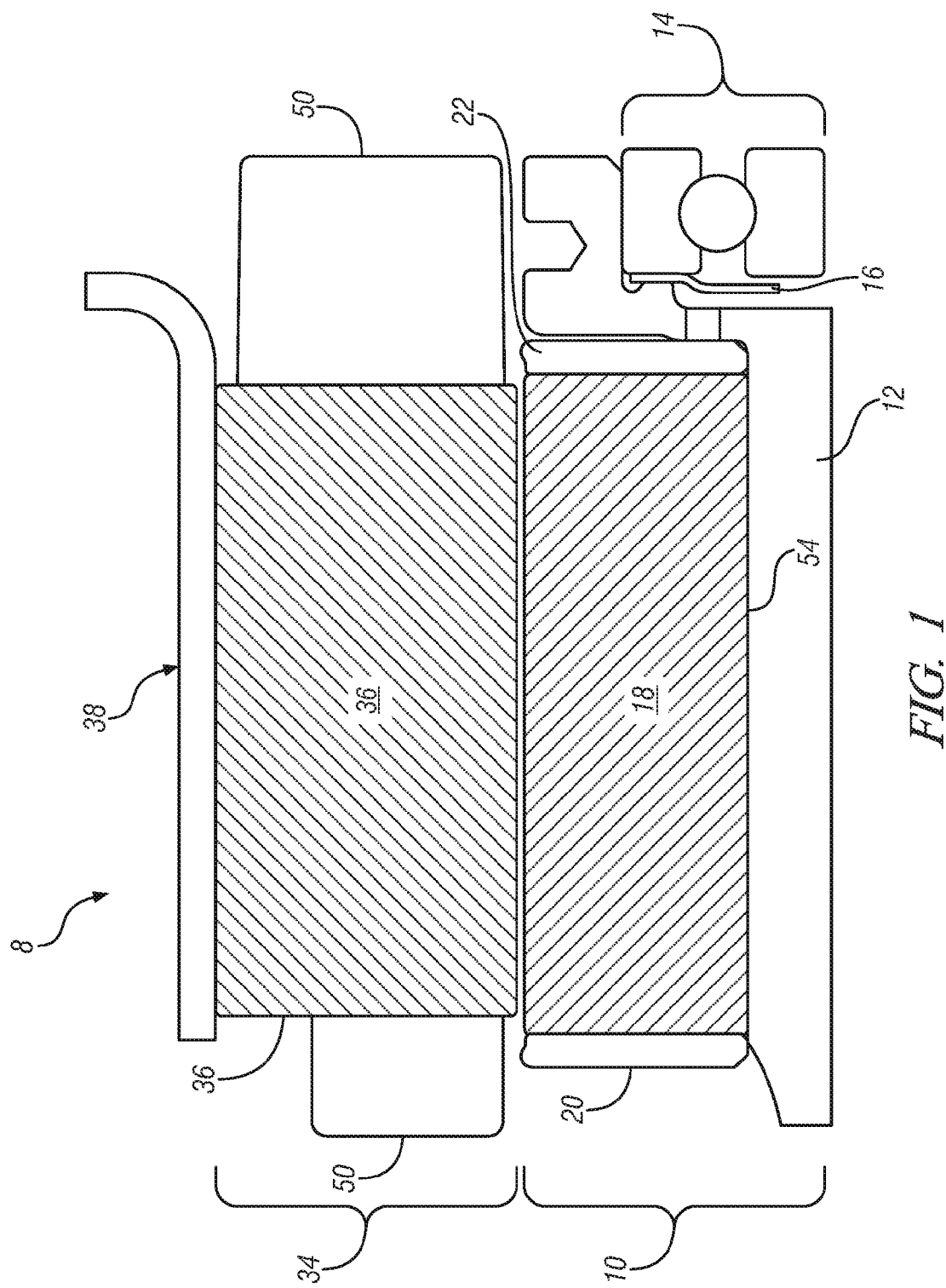
FIG. 1 illustrates a cross sectional view of a rotor assembly having associated end plates with assembly guide rings assembled in combination with a stator assembly in accordance with the present disclosure.
Figure 2:
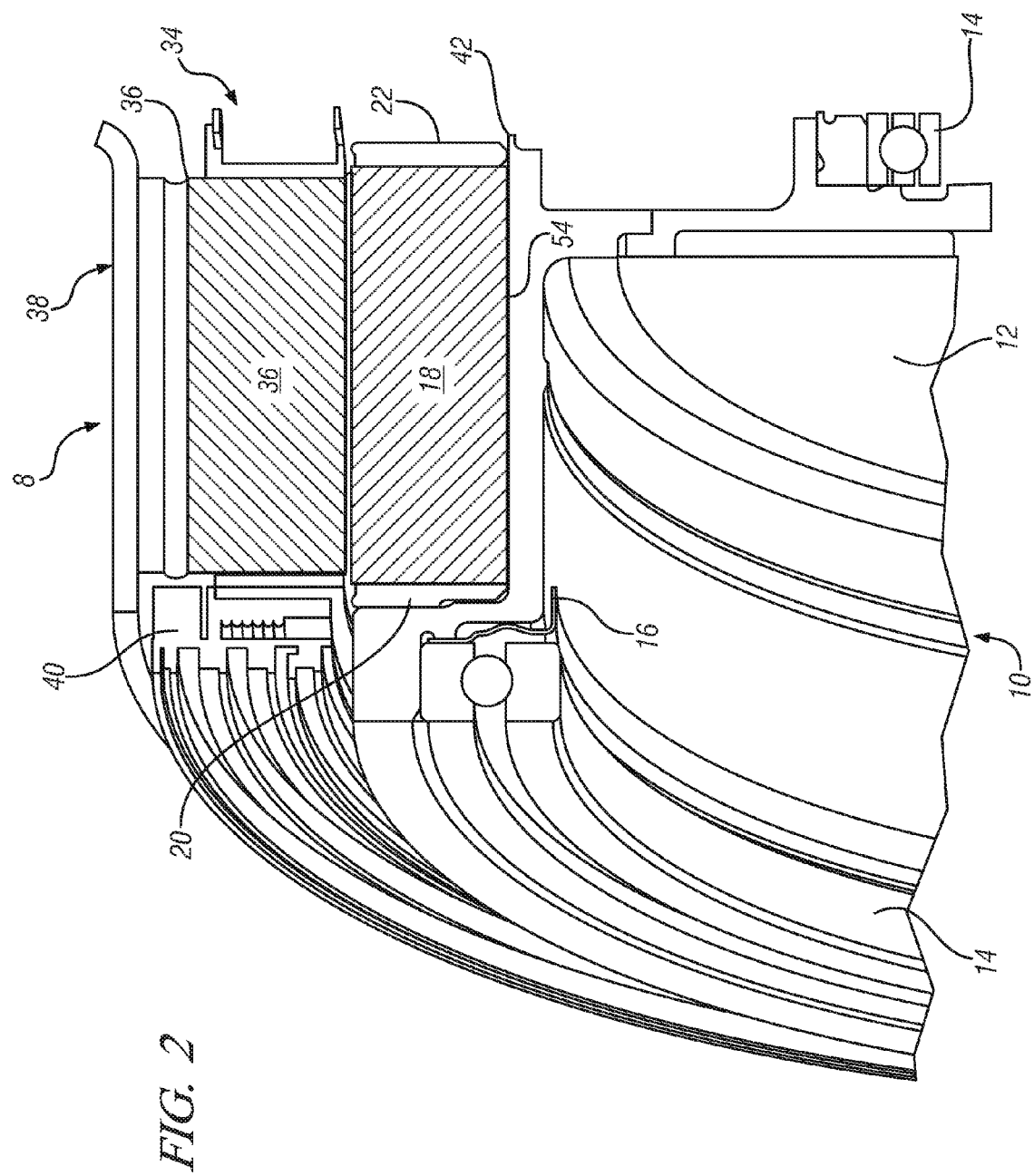
FIG. 2 illustrates a partial perspective sectional view of the rotor assembly and stator assembly combination shown in FIG. 1.
Figure 4:
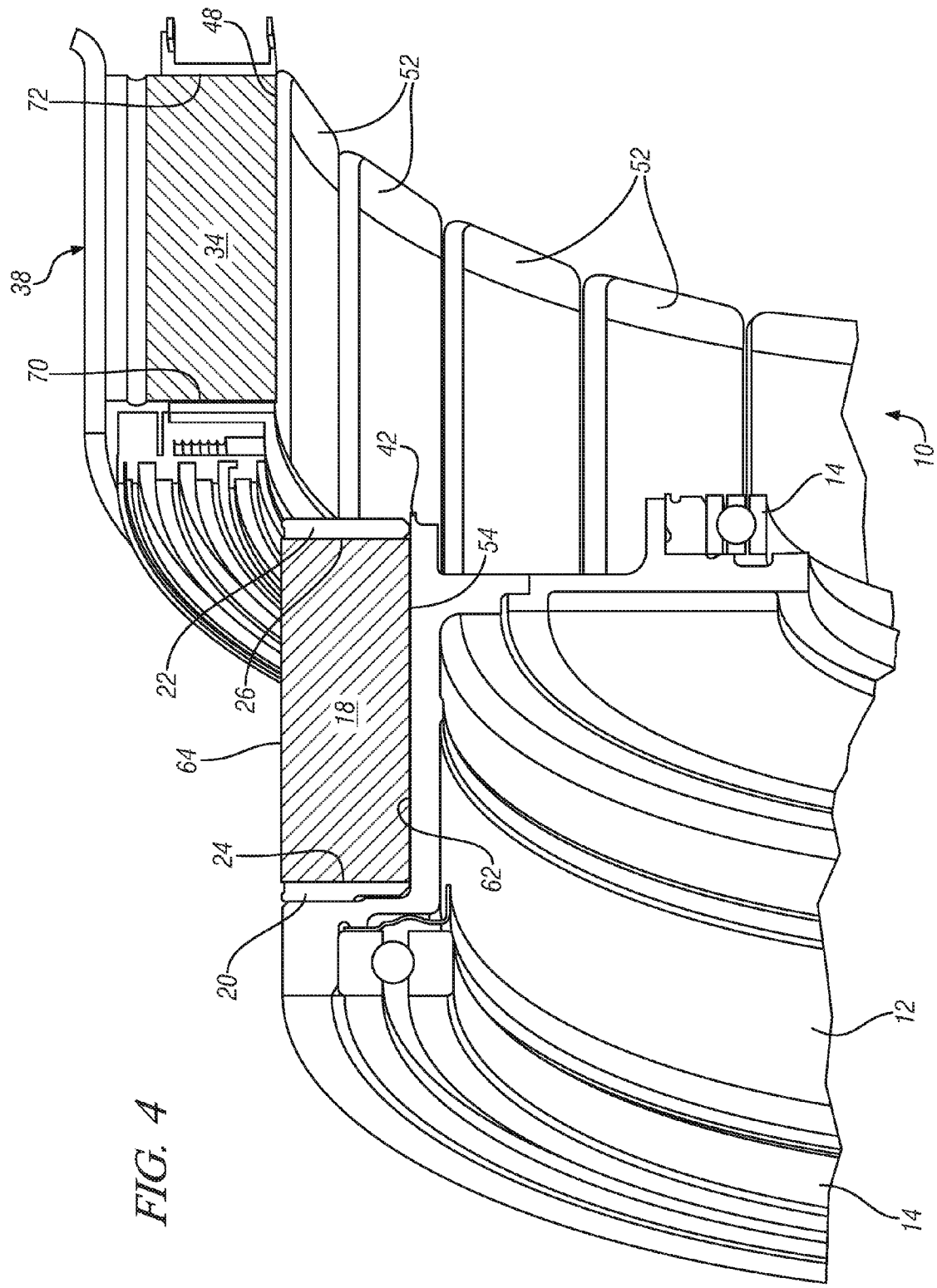
FIG. 4 illustrates a partial perspective view of the rotor assembly and stator assembly combination of FIG. 1 before the rotor assembly is assembled within the stator assembly.

Referring now to the drawings, shown in FIGS. 1, 2, and 4 is a combination rotor and stator assembly 8 including a rotor assembly 10 and a stator assembly 34.

The rotor assembly 10 includes a rotor hub 12 having an outer surface 54 adapted to receive a rotor unit and including a protruding tab 42 adapted to retain the rotor assembly 10 within the stator assembly 34 when assembled with the stator assembly 34; a roller bearing 14; a shield 16 disposed between the rotor hub 12 and the roller bearing 14; a cylindrical rotor unit 18 including first and second opposing ends 24, 26, the rotor unit 18 having an inner cylindrical peripheral wall 62 seated on the outer surface 54 of the rotor hub 12, and an outer cylindrical peripheral wall 64; and a first and a second assembly guide ring 20, 22, that each respectively define an associated one of the pair of end plates, wherein the first and second assembly guide rings are respectively each fitted onto the opposing ends 24, 26 of the rotor unit 18.

In one embodiment, at least one end plate may be used, however, as described with reference to the specific embodiments illustrated in the figures, two end plates are used. As defined herein, the terms end plates and guide rings are used interchangeably.

Figure 3:
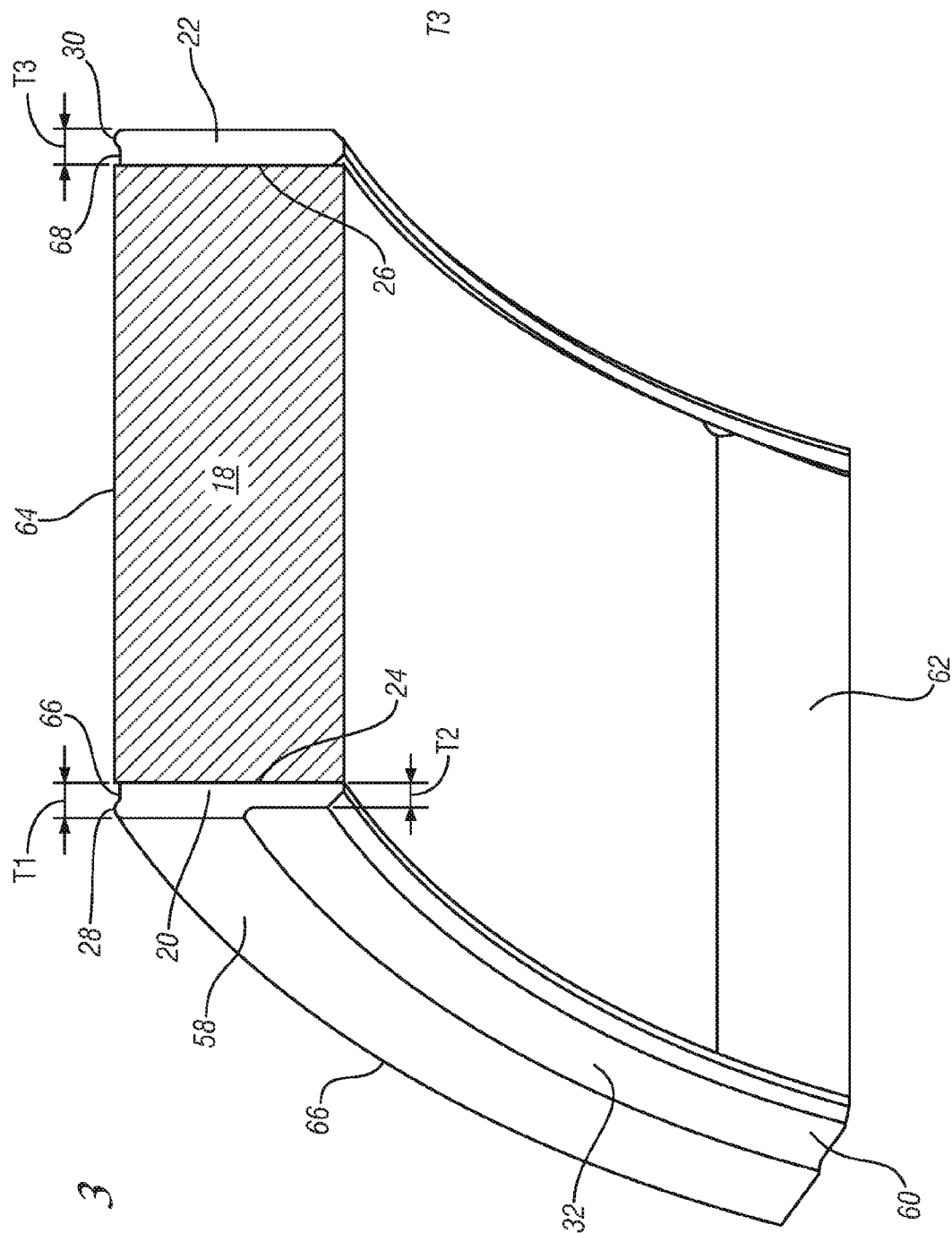
FIG. 3 illustrates a partial perspective enlarged view of the rotor of FIG. 2 disposed between the assembly guide rings.

FIG. 3 is a partial perspective view of the two annular non-magnetic end plate guide rings 20, 22 assembled in combination with the rotor unit 18.

In one embodiment, the guide rings 20, 22 are co-centrically disposed at the opposing ends 24, 26 of the rotor unit 18 and are uniform in shape. Each assembly guide ring 20, 22 provides guidance for the rotor unit 18 as it is being assembled into the stator unit 36. The rotor is slidably assembled into the stator with the leading end of the rotor having a guide ring affixed thereto. During assembly, the leading guide ring prevents undesirable contact of the rotor unit 18 with the stator unit 36. The trailing guide ring may provide additional guidance and relative co-centric alignment of the opposite end of the rotor and the stator unit 36. Generally it is preferable that the outer diameter of the guide rings are no larger than the inner diameter of the stator unit though, depending upon the material used, some interference may be acceptable. More preferable, however, the outer diameter of the guide rings are no grater than and even more preferably slightly less than the inner diameter of the stator unit.

Generally the end plates 20, 22 are composed of a material that is not the same hardness as the stator unit 36. The plates 20, 22 provide ease of sliding the rotor unit 18 with guide protrusions 28, 30 into the stator unit 36 without damage to the stator unit 36.

In an embodiment, shown in FIG. 3, the guide rings may have variations in thickness thereby forming a gap or oil groove 32 between a portion of at least one of the guide rings and the outer surface 54 of the rotor hub 12, wherein the groove 32 allows for oil to flow to the hub 12.

In one embodiment, as shown in FIG. 3, the first ring 20 abutting the first rotor end 24 has a first portion 58 having a thickness T1 and a second portion 60 having a thickness T2 slightly smaller than the thickness T1, such that the difference in thickness between the two portions defines the oil groove 32. The first portion 58 has an arcuate protuberance 28 formed radially outwardly from a first ring outer peripheral wall 66, wherein the protuberance 28 of the first ring outer peripheral wall 66 has a diameter slightly larger than the diameter of the rotor cylindrical outer peripheral wall 64, thereby forming a uniform spacer between an inner peripheral wall of the stator and the outer peripheral wall 64 of the rotor unit 18 when the rotor assembly 10 is assembled within the stator assembly 34. The arcuate protuberance may be circumferentially continuous of discontinuous. For example, in the illustrated embodiments the protuberance is continuous along the entire circumference of the guide ring. However, guide rings may include discrete individual, preferably circumferentially equidistantly spaced arcuate protuberances. Such latter embodiment may resemble a guide ring having a castellated outer periphery.

In one embodiment, as shown in FIG. 3, the second ring 22 abutting the second rotor end 26 has a uniform thickness T3. The second ring 22 has an arcuate protuberance 30 formed radially outwardly from a second ring outer peripheral wall 68, wherein the protuberance 30 of the second ring outer peripheral wall 68 has a diameter equal to the diameter of the first ring protuberance 28, and is thus slightly larger than the diameter of the rotor cylindrical outer peripheral wall 64, thereby forming a uniform spacer between an inner peripheral wall of the stator and the outer peripheral wall 64 of the rotor unit 18 when the rotor assembly 10 is assembled within the stator assembly 34.

The arcuate protrusions 28, 30 each operate to reduce the potential for damage to the motor windings during assembly of the rotor unit 18 to the stator unit 36 by preventing a conventional sharp or chamfered corner on the rotor unit 18 from scraping the stator unit 36.

The distance between the opposing ends of the rotor is slightly larger than the distance between respective opposing ends of the stator, and thus, once assembled together, the end plates 20, 22 are no longer needed to separate the rotor unit 18 from the stator unit 34.

When the rotor unit 18 is assembled within the stator unit 36, the assembly guide ring protrusions 28, 30 do not interfere with the function of the motor and may be allowed to remain within the motor for the life of the motor assembly.

The stator assembly 34 is adapted to co-centrically receive the rotor assembly 10. The stator assembly 34 includes the stator unit 36 having two opposing ends 70, 72, an inner cylindrical wall 48 having a diameter greater than an outer diameter of the rotor assembly 10, a stator housing 38, a plurality of stator teeth 52, a plurality of windings 50, and a connection ring 40.

In an embodiment, the rotor unit 18 is magnetized and the stator unit 36 is formed of a ferrous material.

During assembly of the rotor assembly 10, the guide rings 20, 22 may be shrink-fit or pressed onto respective rotor opposing edges 24, 26 of the rotor unit 18. However, any suitable means of affixing the guide rings 20, 22 with the rotor opposing edges 24, 26 may be used that has come or may come into existence. The rotor unit 18 is then pressed onto the rotor hub 12. The roller bearing 14 is pressed onto the rotor hub 12, thereby integrally forming the rotor assembly 10.

In one embodiment, before the rotor unit 18 is assembled within the stator unit 36, the protruding tab 42 integrally formed with the rotor hub 14 is staked across a portion of the second guide ring 22 to retain the second guide ring 22 in place with respect to the rotor assembly 10.

The protuberances 28, 30 each respectively associated with the first and second guide rings 20, 22 operate to keep the magnetic rotor unit 18 from contacting the interior ferrous wall of the stator unit 36. Thus, the rotor unit 18 slidably assembles within the stator assembly 34 and does not contact the inner cylindrical wall 48 of the stator unit 36.

Additionally, the guide rings may be used as sacrificial mass whereby material removal provides a means of balancing the rotor.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Rotating electric machine apparatus including concentric rotor and stator assemblies comprising:
    an end plate cooperates during assembly of the electric machine apparatus to prevent undesirable contact between the rotor assembly and the stator assembly;
    said endplate defines an assembly guide ring having an outer peripheral wall and a protuberance formed radially outwardly from said outer peripheral wall, wherein the protuberance is circumferentially continuous and forms a uniform spacer between the rotor assembly and the stator assembly;
    wherein the stator assembly comprises:
        a stator unit having opposing ends and an outer cylindrical peripheral wall with an outer wall diameter; and
        said end plate defining said assembly guide ring being located at one of the opposing ends of the stator unit and said protuberance of the assembly guide ring having an outer ring diameter larger than the outer wall diameter of the outer cylindrical peripheral wall of the stator unit.

2. The rotating electric machine apparatus of claim 1 wherein the electric machine apparatus is a magnetic motor.

3. The rotating electric machine apparatus of claim 2, wherein the rotor assembly is magnetized and the stator assembly is ferrous.

4. The electric machine apparatus of claim 3, wherein the end plate is made from non-magnetized material.

5. The rotating electric machine apparatus of claim 1, wherein the rotor assembly comprises:

a rotor unit having opposing ends and an inner cylindrical wall having an inner wall diameter at least as great as the outer ring diameter of the protuberance of the assembly guide ring.

6. The rotating electric machine apparatus of claim 5, wherein the stator assembly is located relative to the rotor assembly such that the assembly guide ring is outside of the inner cylindrical wall of the rotor unit.

7. Rotating electric machine apparatus including concentric rotor and stator assemblies comprising:

an end plate cooperates during assembly of the electric machine apparatus to prevent undesirable contact between the rotor assembly and the stator assembly;

said endplate defines an assembly guide ring having an outer peripheral wall and a protuberance formed radially outwardly from said outer peripheral wall, wherein the protuberance is circumferentially continuous and forms a uniform spacer between the rotor assembly and the stator assembly;

wherein the stator assembly comprises:

a stator unit having opposing ends and an outer cylindrical peripheral wall with an outer wall diameter; and a pair of end plates being located at opposing ends of the stator unit and defining respective assembly guide rings having outer peripheral walls and respective protuberances extending radially from said outer peripheral walls, wherein said protuberances having with outer ring diameters larger than the outer wall diameter of the outer cylindrical peripheral wall of the stator unit.

8. The rotating electric machine apparatus of claim 7, wherein the rotor assembly comprises:

a rotor unit having opposing ends and an inner cylindrical wall having an inner wall diameter at least as great as the outer ring diameters of the protuberances of the respective assembly guide rings.

9. The rotating electric machine apparatus of claim 8, wherein the stator assembly is located relative to the rotor assembly such that the assembly guide rings are outside of the inner cylindrical wall of the rotor unit.

* * * * *

UNITED STATES PATENT AND TRADEMARK OFFICE
CERTIFICATE OF CORRECTION

PATENT NO. : 7,723,895 B2 Page 1 of 1
APPLICATION NO. : 11/936087
DATED : May 25, 2010
INVENTOR(S) : Fredrick R. Poskie, Richard A. Pashnik and Edward L. Kaiser It is certified that error appears in the above-identified patent and that said Letters Patent is hereby corrected as shown below:

On the Title Page:
Item (75) Inventors: Fredrick R. Poskie, Plymouth, MI (US); Richard A. Pashnik, Saline, MI (US); Edward L. Kaiser, Orion, MI (US)

Please correct the first name of Inventor -- Frederick R. Poskie -- to read as "Fredrick R. Poskie".

Signed and Sealed this

Twenty-fourth Day of August, 2010

David J. Kappos
*Director of the United States Patent and Trademark Office*